US010812210B2

(12) United States Patent
Ly et al.

(10) Patent No.: US 10,812,210 B2
(45) Date of Patent: Oct. 20, 2020

(54) INDICATION OF TRANSMITTED SS BLOCKS

(71) Applicant: QUALCOMM Incorporated, San Diego, CA (US)

(72) Inventors: Hung Dinh Ly, San Diego, CA (US); Tao Luo, San Diego, CA (US); Heechoon Lee, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/121,523

(22) Filed: Sep. 4, 2018

(65) Prior Publication Data
US 2019/0081721 A1    Mar. 14, 2019

Related U.S. Application Data

(60) Provisional application No. 62/556,789, filed on Sep. 11, 2017.

(51) Int. Cl.
| | |
|---|---|
| *H04J 11/00* | (2006.01) |
| *H04B 7/06* | (2006.01) |
| *H04L 5/00* | (2006.01) |
| *H04W 56/00* | (2009.01) |
| *H04B 7/0413* | (2017.01) |
| *H04W 16/28* | (2009.01) |

(52) U.S. Cl.
CPC ........ *H04J 11/0069* (2013.01); *H04B 7/0695* (2013.01); *H04L 5/0048* (2013.01); *H04W 56/001* (2013.01); *H04B 7/0413* (2013.01); *H04W 16/28* (2013.01)

(58) Field of Classification Search
CPC ......... H04J 11/00; H04J 11/0069; H04L 5/00; H04L 5/0048; H04W 56/00; H04W 56/001; H04B 7/0695
See application file for complete search history.

(56) References Cited

U.S. PATENT DOCUMENTS

| | | | |
|---|---|---|---|
| 2018/0227867 A1* | 8/2018 | Park | H04L 5/0053 |
| 2018/0234931 A1* | 8/2018 | Ly | H04L 5/0048 |

(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 8)", 3GPP TS 36.211 V8.8.0 (Sep. 2009).

(Continued)

*Primary Examiner* — Kyaw Z Soe
(74) *Attorney, Agent, or Firm* — Qualcomm IP Dept.; James Hunt Yancey, Jr.; Paul Kuo

(57) ABSTRACT

Methods, systems, and devices for wireless communication are described. A base station may determine a group set of at least one synchronization signal (SS) block group to be transmitted within a SS burst set. The base station may identify a group transmission configuration index associated with the group set, and then transmit the group transmission configuration index to a user equipment. The base station may also include an indication of which SS blocks in each transmitted SS block group are transmitted. A user equipment (UE) may determine transmitted SS blocks based on the group set index or the indication of which SS blocks in each transmitted SS block group are transmitted.

30 Claims, 12 Drawing Sheets

(56) References Cited

U.S. PATENT DOCUMENTS

2018/0279135 A1\* 9/2018 Hwang ................ H04L 5/0053
2019/0215790 A1\* 7/2019 Kim .................... H04B 7/2656

OTHER PUBLICATIONS

Huawei et al., "Remaining Details on NR SS blocks", 3GPP Draft; R1-1715385, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 21, 2017-Sep. 9, 2017 (Sep. 9, 2017), XP051328950, Retrieved from the Internet: URL:http://www.3gpp.org/ftp/tsg ran/WG1_RL1/TSGR1_AH/NR_AH_1709/Docs/ [retrieved on Sep. 9, 2017], 3 pages.
Interdigital Inc: "On SS Block and Burst Set Design and Indication", 3GPP Draft; R11714129 on SS Block and Burst Set Design and Indication, 3rd Generation Partnership Project (3GPP), Mobile Competence Centre; 650, Route Des Lucioles; F-06921 Sophia-Antipolis Cedex; France, vol. Ran WG1, No. Prague, Czech Republic; Aug. 21, 2017-Aug. 25, 2017 (Aug. 20, 2017), XP051316918, Retrieved from the Internet:URL:http://www.3gpp.org/ftp/Meetings 3GPP Sync/RAN1/Docs/ [retrieved on Aug. 20, 2017], Sections 1-4, 4 pages.
International Search Report and Written Opinion—PCT/US2018/049613—ISA/EPO—Nov. 28, 2018.
Motorola Mobility et al., "Discussion on Remaining Issues of SS Block and SS Burst Set", 3GPP Draft; R1-1714212 Discussion on Remaining Issues of SS Block and SS Burst Set, 3rd Generation Partnership Project (3GPP), Mobile Competence Centre; 650, Route Des Lucioles; F-06921 Sophia-Antipolis Cedex; France, vol. Ran WG1, No. Prague, Czech Republic; Aug. 21, 2017-Aug. 25, 2017 Aug. 20, 2017 (Aug. 20, 2017), XP051317001, Retrieved from the Internet: URL:http://www.3gpp.org/ftp/Meetings_3GPP_SYNC/RAN1/Docs/ [retrieved on Aug. 20, 2017], 6 pages.
Qualcomm Incorporated: "Remaining Details on Synchronization Signal Design", 3GPP Draft; R1-1716378 Remaining Details on Synchronization Signal Design, 3rd Generation Partnership Project (3GPP), Mobile Competence Centre; 650, Route Des Lucioles; F-06921 Sophia-Antipolis Cedex; France, vol. Ran WG1, No. Nagoya, Japan; Sep. 18, 2017-Sep. 21, 2017 Sep. 17, 2017 (Sep. 17, 2017), XP051339833, Retrieved from the Internet: URL:http://www.3gpp.org/ftp/Meetings_3GPP_SYNC/RAN1/Docs/ [retrieved on Aug. 17, 2017], 9 pages.
International Preliminary Report on Patentability—PCT/US2018/049613 The International Bureau of WIPO—Geneva, Switzerland, Mar. 26, 2020.

\* cited by examiner

INDICATION OF TRANSMITTED SS BLOCKS

CLAIM OF PRIORITY UNDER 35 U.S.C. § 119

The present application for patent claims priority to Provisional Application No. 62/556,789 entitled "INDICATION OF TRANSMITTED SS BLOCKS" filed Sep. 11, 2017 assigned to the assignee hereof and hereby expressly incorporated by reference herein.

BACKGROUND

Aspects of the present disclosure relate generally to wireless communication systems and to signaling of transmitted synchronization signal blocks.

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

SUMMARY

A base station may determine a group set of at least one synchronization signal (SS) block group to be transmitted within a SS burst set. The base station may identify a group transmission configuration index associated with the group set, and then transmit the group transmission configuration index to a user equipment. The base station may also include an indication of which SS blocks in each transmitted SS block group are transmitted. A user equipment (UE) may determine transmitted SS blocks based on the group transmission configuration index or the indication of which SS blocks in each transmitted SS block group are transmitted.

A method of indicating transmitted SS blocks is described. The method may include determining a group set of at least one synchronization signal (SS) block group to be transmitted within a SS burst set, identifying a group transmission configuration index associated with the group set, and transmitting the group transmission configuration index to a user equipment.

An apparatus for wireless communication is described. The apparatus may include a processor, memory in electronic communication with the processor, and instructions stored in the memory and operable, when executed by the processor, to cause the apparatus to determine a group set of at least one synchronization signal (SS) block group to be transmitted within a SS burst set, identify a group transmission configuration index associated with the group set, and transmit the group transmission configuration index to a user equipment.

A non-transitory computer-readable medium storing code for wireless communication is described. The code may include instructions executable to determine a group set of at least one synchronization signal (SS) block group to be transmitted within a SS burst set, identify a group transmission configuration index associated with the group set, and transmit the group transmission configuration index to a user equipment.

An apparatus for wireless communication is described. The apparatus may include means for determining a group set of at least one synchronization signal (SS) block group to be transmitted within a SS burst set, means for identifying a group transmission configuration index associated with the group set, and means for transmitting the group transmission configuration index to a user equipment.

In some examples of the method, apparatuses, or non-transitory computer-readable medium described herein, the at least one SS block group includes logically consecutive SS blocks to be transmitted within the SS burst set. In some cases, the group set includes logically consecutive SS block groups to be transmitted within the SS burst set. In some cases, the group transmission configuration index is identified from a plurality of group transmission configuration indices, each of the group transmission configuration indices associated with a different group set comprising a different pattern of SS block groups to be transmitted within the SS burst set. In some cases, the plurality of group transmission configuration indices comprises group transmission configuration indices associated with a subset of all possible patterns of SS block groups available for transmission to the user equipment. Some examples of the method, apparatuses, or non-transitory computer-readable medium described herein may further include processes, features, means, or instructions for transmitting each SS block in the group set to the user equipment.

Some examples of the method, apparatuses, or non-transitory computer-readable medium described herein may further include processes, features, means, or instructions for determining at least one SS block within the at least one SS block group that will be transmitted, generating an indication of the at least one SS block, and transmitting the indication to the user equipment. In some cases, the determining the at least one SS block comprises identifying a number of sub-groups from the at least one SS block group to be transmitted within a particular SS block group. In some cases, an identified sub-group comprises logically consecutive SS blocks to be transmitted to the user equipment. In some cases, the indication of the at least one SS block includes the number of sub-groups. In some cases, the indication of the at least one SS block includes a bitmap indicating which SS block of the at least one SS block group is to be transmitted.

A method for indicating transmitted SS blocks is described. The method may include identifying a group transmission configuration index associated with a group set of at least one synchronization signal (SS) block group to be transmitted within a SS burst set, determining at least one SS block within the at least one SS block group that will be transmitted, generating an indication of the at least one SS block, and transmitting the group transmission configuration index and the indication to a user equipment.

In some examples of the method, apparatuses, or non-transitory computer-readable medium described herein, the determining the at least one SS block comprises identifying a number of sub-groups from the at least one SS block group to be transmitted within a particular SS block group. In some cases, an identified sub-group comprises logically consecutive SS blocks to be transmitted to the user equipment. In some cases, the indication of the at least one SS block includes the number of sub-groups.

Some examples of the method, apparatuses, or non-transitory computer-readable medium described herein may further include processes, features, means, or instructions for transmitting, for each SS block group in the group set, the number of sub-groups beginning from a first sub-group of the SS block group, wherein the transmitted sub-groups are logically consecutive. Some examples of the method, apparatuses, or non-transitory computer-readable medium described herein may further include processes, features, means, or instructions for transmitting, for each SS block group in the group set, the number of sub-groups based on a last sub-group of the SS block group, wherein the transmitted sub-groups are logically consecutive. In some cases, the indication of the at least one SS block includes a bitmap indicating which SS block of the at least one SS block group is to be transmitted. Some examples of the method, apparatuses, or non-transitory computer-readable medium described herein may further include processes, features, means, or instructions for transmitting, for each SS block group in the group set, a pattern of SS blocks based on the determining. In some cases, the indication of the at least one SS block includes an SS block transmission configuration index identified from a plurality of SS block transmission configuration indices, each of the SS block transmission configuration indices associated with a different combination of logically consecutive SS blocks to be transmitted within the at least one SS block group.

A method for wireless communications is described. The method may include receiving a group transmission configuration index associated with a group set of at least one synchronization signal (SS) block group transmitted by a base station within a SS burst set, determining SS blocks that are transmitted within the SS burst set by the base station based on the group transmission configuration index, and receiving the determined SS blocks.

An apparatus for wireless communication is described. The apparatus may include a processor, memory in electronic communication with the processor, and instructions stored in the memory and operable, when executed by the processor, to cause the apparatus to receive a group transmission configuration index associated with a group set of at least one synchronization signal (SS) block group transmitted by a base station within a SS burst set, determine SS blocks that are transmitted within the SS burst set by the base station based on the group transmission configuration index, and receive the determined SS blocks.

A non-transitory computer-readable medium storing code for wireless communication is described. The code may include instructions executable to receive a group transmission configuration index associated with a group set of at least one synchronization signal (SS) block group transmitted by a base station within a SS burst set, determine SS blocks that are transmitted within the SS burst set by the base station based on the group transmission configuration index, and receive the determined SS blocks.

An apparatus for wireless communication is described. The apparatus may include means for receiving a group transmission configuration index associated with a group set of at least one synchronization signal (SS) block group transmitted by a base station within a SS burst set, means for determining SS blocks that are transmitted within the SS burst set by the base station based on the group transmission configuration index, and means for receiving the determined SS blocks.

Some examples of the method, apparatuses, or non-transitory computer-readable medium described herein may further include processes, features, means, or instructions for performing a rate matching procedure based on the SS blocks that are transmitted within the SS burst set. Some examples of the method, apparatuses, or non-transitory computer-readable medium described herein may further include processes, features, means, or instructions for receiving an indication of at least one SS block within the at least one SS block group that is transmitted by the base station, and determining, based on the indication, which SS blocks within each SS block group are transmitted by the base station. In some cases, the indication is a bitmap indicating which SS blocks in a SS block group are transmitted by the base station.

A method performed by a user equipment is described. The method may include receiving a group transmission configuration index and an indication of at least one SS block within at least one SS block group that is transmitted by a base station, determining, based on the group transmission configuration index, which SS block groups are transmitted by the base station, and determining, based on the indication, which SS blocks within each SS block group are transmitted by the base station.

In some examples of the method, apparatuses, or non-transitory computer-readable medium described herein, the indication is a bitmap indicating which SS blocks in a SS block group are transmitted by the base station. In some cases, the indication is a number of transmitted sub-groups from each SS block group. In some cases, the determining which SS blocks within each SS block group are transmitted comprises identifying logically consecutive sub-groups based on the number of transmitted sub-groups and a first sub-group or a last sub-group of a SS block group. In some cases, the indication is an SS block transmission configuration index combination of logically consecutive SS blocks to be transmitted within each SS block group.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
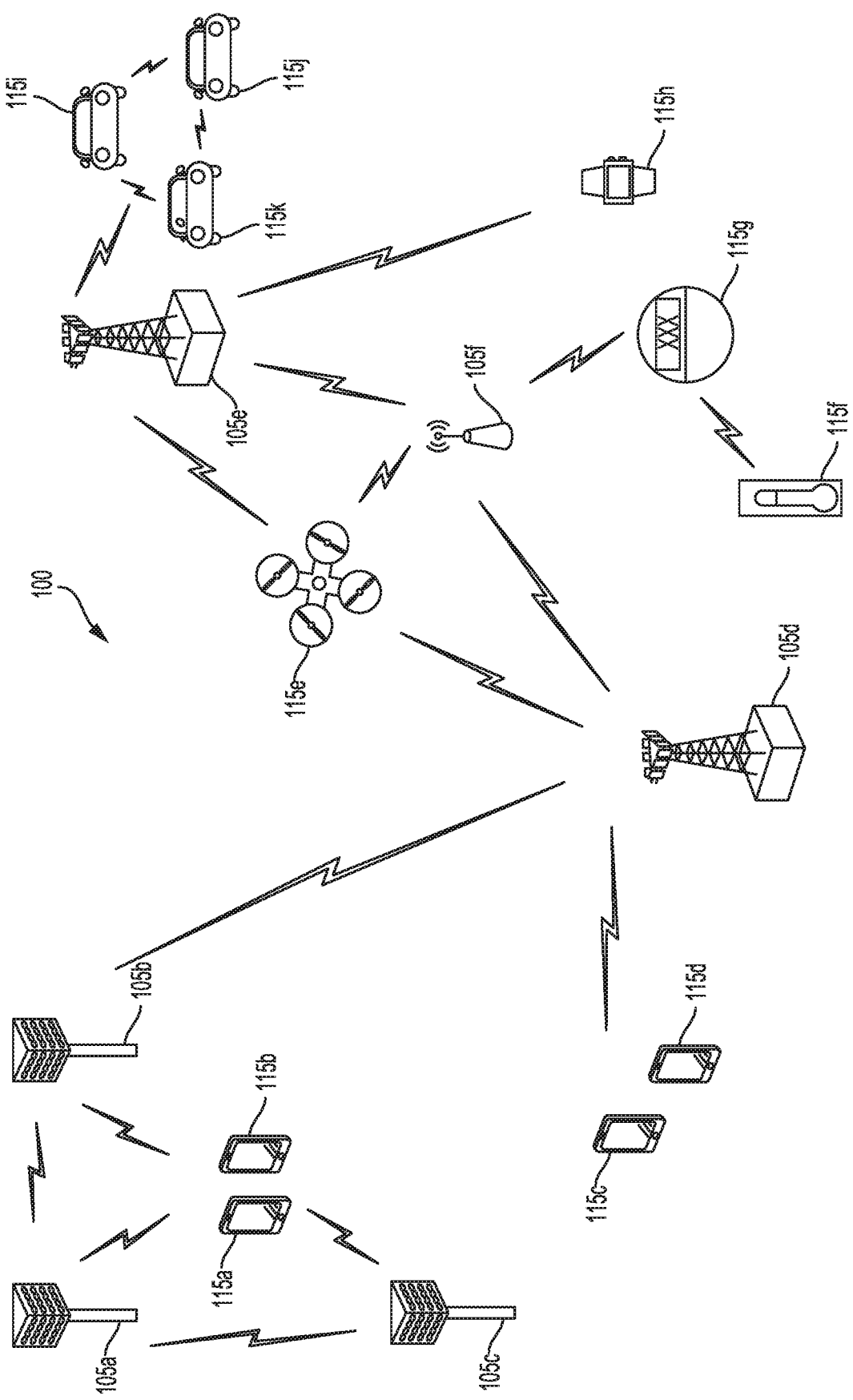
FIG. 1 is a block diagram illustrating details of a wireless communication system.

A cell search procedure in wireless cellular communication systems allows devices to acquire cell and synchronization information. The cell search procedure may involve the broadcasting of certain physical signals in each cell. In some instances, a base station transmits a primary synchronization signal (PSS) and a secondary synchronization signal (SSS) to facilitate cell search and acquisition. The detection and processing of the PSS and SSS by a user equipment (UE) may enable time and frequency synchronization as well as provide the physical layer identity of the cell to the UE, in addition to other initial access information.

In certain configurations, such as in a new radio (NR) configuration, a base station may transmit a synchronization signal (SS) block comprising a PSS and SSS multiplexed with a physical broadcast channel (PBCH). In some instances, the PBCH may include reference signals such as demodulation reference signals (DMRS) signals. The SS block may, in some cases, also be referred to as a SS/PBCH block because it comprises both synchronization signals and a PBCH. The base station may transmit an SS block burst, comprising multiple and repeated SS block transmissions within a particular time frame to facilitate coverage enhancement or a beam sweeping procedure of transmitting synchronization signals to UEs in different locations.

The time frame within which the number of SS block transmissions are sent may be a discovery reference signal (DRS) measurement timing configuration (DMTC) window. The DMTC window may be a time frame within which the UE may measure DRS for a cell, including synchronization signals, cell specific reference signals, a master information block (MIB) and other signaling useful for identifying or attaching to a cell.

In some instances, the number of SS block transmissions within the DMTC window may be limited based on factors such as the subcarrier spacing used by the system or frequency band in which the base station operates. For example, in current NR (5G new radio) agreement, if the system operates in a frequency band below 3 GHz, the base station may be limited to a maximum of four SS block transmissions within a 5 ms time frame. In another example, if the system operates in a frequency band between 3 and 6 GHz, the base station may be limited to a maximum of eight SS block transmissions within a 5 ms time frame. In yet another example, if the system operates in a frequency band above 6 GHz, the base station may be limited to a maximum of sixty-four SS block transmissions within a 5 ms time frame.

While a base station may submit up to the maximum allowed SS block transmissions for a particular frequency band, the base station has flexibility to transmit fewer SS block transmissions within a 5 ms time frame, such as in instances where it does not need to transmit the maximum number of SS block transmissions or for power saving purposes. In such instances, there may be benefits to a base station sending an indication of which SS blocks are actually transmitted within a 5 ms window, such as allowing a UE to perform rate matching, radio resource management (RRM) measurement, or RACH resource association, etc. based on the actually transmitted SS blocks within the 5 ms window.

In some cases, a base station may use a bitmap to indicate which SS blocks are actually transmitted by the base station. For example, there may be predefined locations within a 5 ms window (e.g., two SS blocks per slot at particular resources) which are allocated for SS block transmissions. In a 5 ms window, for operation in a frequency band below 3 GHz, the base station may transmit up to four SS block transmissions at the allocated resources, and each digit of a binary bitmap may indicate whether a SS block is actually transmitted at a corresponding allocated resource. Accordingly, in the present example, a four-bit bitmap may be used to indicate which of the four possible SS blocks are actually transmitted at their respective allocated locations or resources. The full bitmap may be signaled to UEs using various mechanisms, such as via UE-specific RRC signaling for connected mode operation, or in Remaining Minimum System Information (RMSI) for initial access operations.

In the example above, a four-bit bitmap may be used to indicate actually transmitted SS blocks for a base station operating in a frequency below 3 GHz, which limits the base station to transmitting a maximum of four SS blocks within a 5 ms window. In higher frequency bands, however, the maximum allowed SS block transmissions within a 5 ms window may be much larger, and up to 64 SS block transmissions when the system operates in frequency bands over 6 GHz. Accordingly, in a configuration operating in a frequency band over 6 GHz, a 64-bit bitmap would be required to indicate the actual transmissions of SS blocks within a SS block burst set. A compressed form of indication may reduce the resources required for indicating actually transmitted SS blocks, especially in over 6 GHz operation where there are 64 possible SS block transmissions within a burst set.

In some instances, a base station may transmit SS blocks in logically consecutive locations when possible. In particular, the base station may form SS block groups, and within each group, the base station actually transmits all possible SS block transmissions. By following this procedure, the base station may indicate which SS block groups are actually transmitted instead of having to indicate which of each possible SS block within a burst set are actually transmitted, resulting in a bitmap with fewer required bits. For example, a base station may divide the 64 possible SS block transmissions into four groups of sixteen SS blocks each. Instead of indicating whether an SS block is actually transmitted for each of the 64 locations, the base station may indicate which of the four groups are transmitted (such as through an index of a group combination table or through a group bitmap), which would require only four bits instead of 64.

In some implementations, the base station may use a pattern of SS blocks for transmission with a greater level of granularity of logically consecutive SS blocks. For example, the base station may further divide each SS block group into sub-groups, and select particular logically consecutive sub-groups for SS block transmission. The base station may then indicate which sub-groups within a SS block group will include actually transmitted SS blocks by appending additional digits to the indication. In other instances, the base station may indicate which SS blocks within a SS block group using an index associated with a combination of logically consecutive SS blocks transmitted within a SS block group. The indication of transmitted SS blocks by a neighbor cell may also be transmitted by a serving cell, such as for mobility management purposes. In some instances, the indication of the neighbor cell SS block transmission pattern may be in the form of a delta difference from the SS block pattern of the serving cell.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to using a pattern of SS block transmission that allows efficient signaling of which SS blocks are transmitted out of a maximum set of possible SS block transmissions. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1 M nodes/km2), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth, for example. For other various indoor wideband implementations, using a TDD over the unlicensed portion of the 5 GHz band, the subcarrier spacing may occur with 60 kHz over a 160 MHz bandwidth, for example. Finally, for various deployments transmitting with mmWave components at a TDD of 28 GHz, subcarrier spacing may occur with 120 kHz over a 500 MHz bandwidth, for example. Other deployments of different subcarrier spacing over different bandwidths are also within the scope of the present disclosure.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs may allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of evolved node Bs (eNBs) 105 and other network entities. An eNB may be a station that communicates with the UEs and may also be referred to as a base station, an access point, a gNB, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105d and 105e are regular macro eNBs, while eNBs 105a-105c are macro eNBs enabled with one of 3 dimension (3D), full dimension (FD), or massive MIMO. eNBs 105a-105c take advantage of their higher dimension MIMO capabilities to exploit 3D beamforming in both elevation and azimuth beamforming to increase coverage and capacity. eNB 105f is a small cell eNB which may be a home node or portable access point. An eNB may support one or multiple (e.g., two, three, four, and the like) cells.

The 5G network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the eNBs, whether macro eNB, small cell, or the like. In FIG. 1, a lightning bolt (e.g., communication links) indicates wireless transmissions between a UE and a serving eNB, which is an eNB designated to serve the UE on the downlink and/or uplink, or desired transmission between eNBs, and backhaul transmissions between eNBs.

The communication links depicted in FIG. 1 may include communication links in licensed, unlicensed, or shared radio frequency (RF) spectrum. In some instances, a shared spectrum band may refer to spectrum that is lightly licensed and/or in which there may be some level of coordination among communications of different radio access technologies (RATs) or some level of preference given to communications of a particular RAT, such as an incumbent RAT, for example. In other instances, a shared spectrum band may generally refer to spectrum in which different RATs coexist or operate within the same RF spectrum band, which may include lightly licensed/coordinated spectrum or, alternatively, purely unlicensed spectrum in which different RATs may freely contend for access to the channel medium using various channel contention techniques. The aspects described in the present disclosure may be applicable to various shared or unlicensed spectrum regimes. Accordingly, the terms shared spectrum and unlicensed spectrum are used interchangeably herein unless otherwise noted.

In operation at 5G network 100, eNBs 105a-105c serve UEs 115a and 115b using 3D beamforming and coordinated spatial techniques, such as coordinated multipoint (CoMP) or multi-connectivity. Macro eNB 105d performs backhaul communications with eNBs 105a-105c, as well as small cell, eNB 105f. Macro eNB 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also supports mission critical communications with ultra-reliable and redundant links for mission critical devices, such UE 115e, which is a drone in the example depicted in FIG. 1. Redundant communication links with UE 115e include from macro eNBs 105d and 105e, as well as small cell eNB 105f. Other machine type devices, such as UE 115f (thermometer), UE 115g (smart meter), and UE 115h (wearable device) may communicate through 5G network 100 either directly with base stations, such as small cell eNB 105f, and macro eNB 105e, or in multi-hop configurations by communicating with another user device which relays its information to the network, such as UE 115f communicating temperature measurement information to the smart meter, UE 115g, which is then reported to the network through small cell eNB 105f. 5G network 100 may also provide additional network efficiency through dynamic, low-latency TDD/FDD communications, such as in a vehicle-to-vehicle (V2V) mesh network between UEs 115i-115k communicating with macro eNB 105e.

In a 5G network 100, a base station 105 may transmit synchronization signals in the form of SS blocks to UEs 115 to allow UEs 115 to obtain synchronization information of the network. Certain predefined resources are allocated for SS block transmission within a particular time window, but the base station 105 may be restricted (e.g., as dictated by wireless standards) in the number of SS block transmissions it may transmit within a particular time window (e.g., DMTC window). The base station 105 may also transmit fewer than the maximum allowed SS blocks within the DMTC window. Thus, the base station 105 has flexibility in the number of SS blocks it may transmit within a DMTC window, while a UE 115 may not know how many SS blocks a serving (or neighboring) base station 105 is transmitting or which particular resources out of the available allocated resources are used for transmission of SS blocks.

The base station 105 may accordingly signal an indication of the pattern and number of transmitted SS blocks to a UE to assist the UE with rate matching and other operations. To improve efficiency of such signaling, the base station 105 may select a particular pattern of SS block transmissions that would allow fewer bits required for indicating SS blocks transmitted, such as dividing the potential SS block transmission locations into groups and transmitting SS blocks in a logically consecutive manner within each group. Such an SS block transmission pattern may result in significant improvement in resource utilization, especially for configurations operating in higher frequency bands (e.g., above 6 GHz operation). The base station 105 may use the group indication aspect as well as other options for indicating transmitted SS blocks, as will be described in further detail herein.

The techniques described herein relate to the SS blocks that are actually transmitted by a base station 105 as opposed to all the potential opportunities for SS block transmissions where the base station 105 may or may not actually transmit an SS block. Accordingly, the actually transmitted SS blocks may be referred to as "transmitted SS blocks," as used herein.

Figure 2:
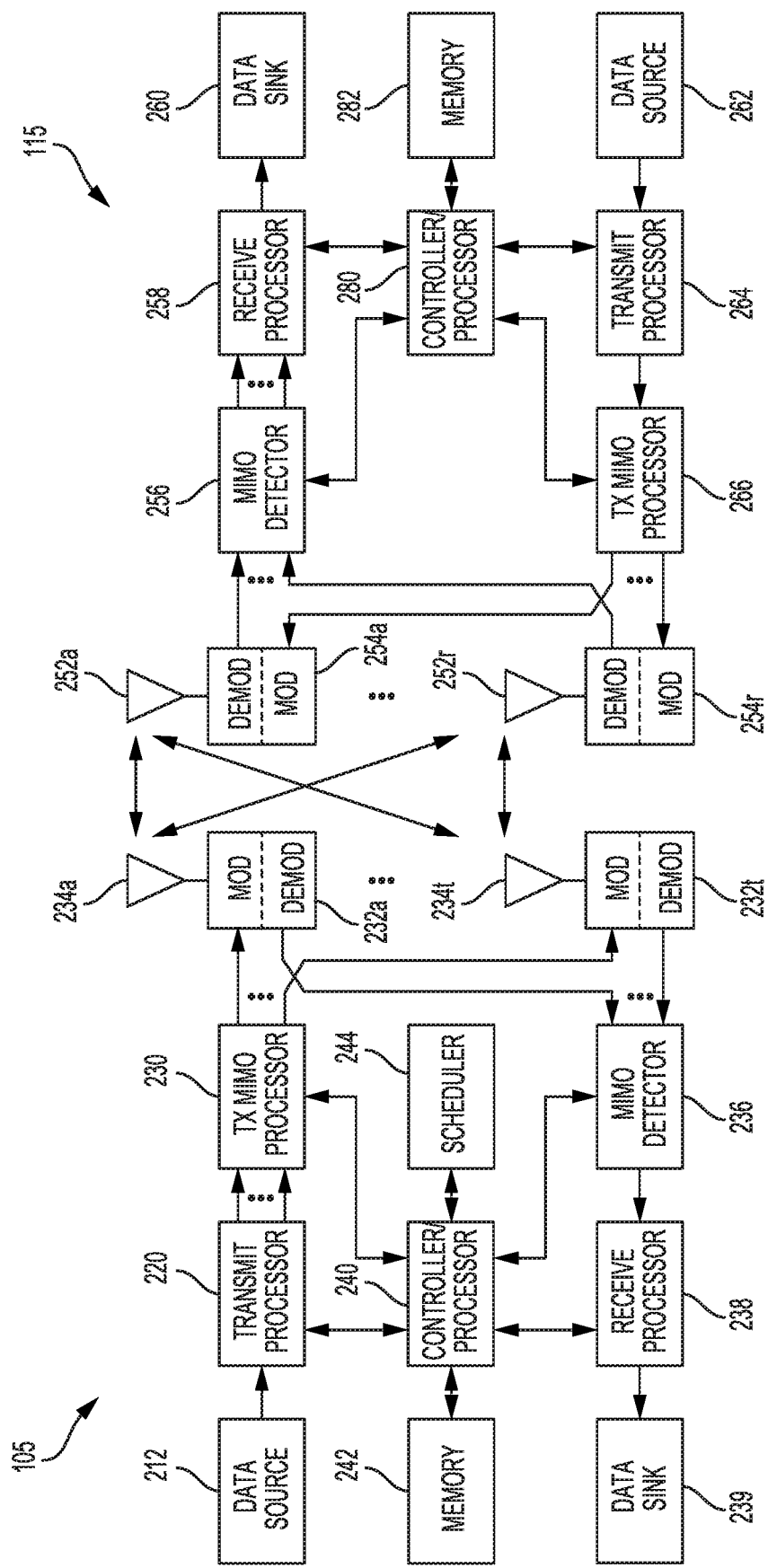
FIG. 2 is a block diagram illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. At the eNB 105, a transmit processor 220 may receive data from a data source 212 and control information from a controller/processor 240. The control information may be for various control channels such as the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of the functional blocks illustrated in FIGS. 9-10, and/or other various processes for the techniques described herein. The controllers/processor 280 and/or other processors and modules at the UE 115 may also perform or direct the execution of the functional blocks illustrated in FIGS. 11-12, and/or other processes for the techniques described herein. The memories 242 and 282 may store data and program codes for the eNB 105 and the UE 115, respectively. For example, memory 242 may store instructions that, when performed by the processor 240 or other processors depicted in FIG. 2, cause the base station 105 to perform operations described with respect to FIGS. 9-10. Similarly, memory 282 may store instructions that, when performed by processor 280 or other processors depicted in FIG. 2, cause the UE 115 to perform operations described with respect to FIGS. 11-12. A scheduler 244 may schedule UEs for data transmission on the downlink and/or uplink.

While blocks in FIG. 2 are illustrated as distinct components, the functions described above with respect to the blocks may be implemented in a single hardware, software, or combination component or in various combinations of components. For example, the functions described with respect to the transmit processor 220, the receive processor 238, or the TX MIMO processor 230 may be performed by or under the control of processor 240.

Figure 3:
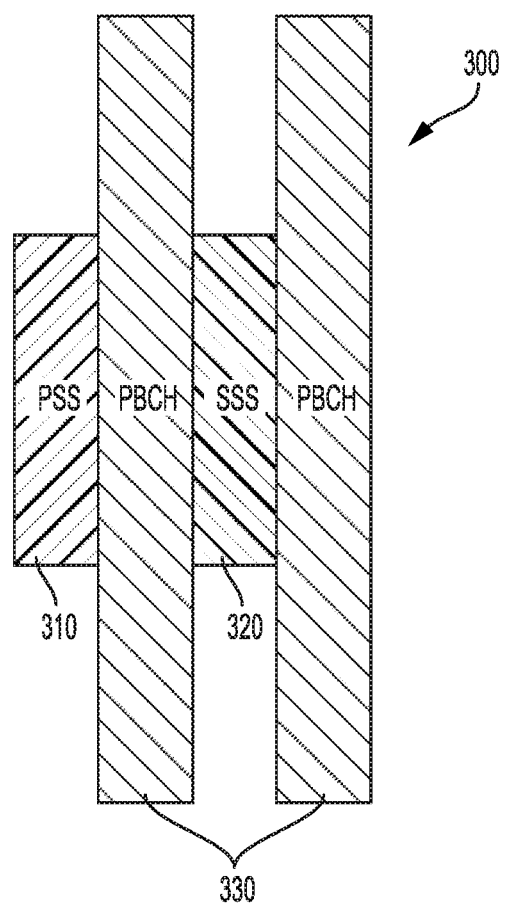
FIG. 3 illustrates an example structure of a SS block.

In 5G network 100, cell synchronization procedures may involve base station 105 broadcasting a set of signals in a synchronization signal (SS) block to facilitate cell search and synchronization by UEs 115. FIG. 3 illustrates an example of the structure of a SS block 300 broadcasted by base station 105. The configuration of SS block 300 includes a PSS 310, a SSS 320, and PBCH 330 multiplexed between the PSS 310 and SSS 320 as shown in FIG. 3. The PBCH 330 may include reference signals such as demodulation reference signals (DMRS) signals. Accordingly, each SS block 300 transmitted by base station 105 may help the UE 115 determine system timing information such as a symbol timing based on PSS 310, cell identification based on PSS 310 and SSS 320, and other parameters needed for initial cell access based on a Master Information Block (MIB) sent in the PBCH 330.

In some implementations, the PSS 310 and SSS 320 each occupy one symbol in the time domain, while the PBCH 330 occupies two symbols but is split into two parts with a first half in one symbol between the PSS 310 and SSS 320, and a second half in a second symbol after SSS 320, as seen in FIG. 3. In the frequency domain, the PSS 310 and SSS 320 may each occupy 127 resource elements or subcarriers, while the PBCH 330 may occupy 288 resource elements. The frequency location of the SS block 300 may not necessarily be in the center 6 resource blocks of the frequency band but may vary depending on the sync raster and may be a function of channel raster parameters.

Base station 105 may periodically transmit an SS block 300 to allow UEs 115 the opportunity to synchronize with the system. In 5G networks, however, the base station 105 may transmit multiple instances of SS blocks in a synchronization burst, instead of, for example, only one instance of PSS and SSS every 5 ms. In a synchronization burst, multiple SS block transmissions may be sent within a 5 ms time window. The multiple SS block transmissions may allow for coverage enhancements and/or directional beams to UEs in different locations. The base station 105, however, may be limited by predefined rules in the number of SS blocks and the corresponding locations of the SS blocks it can transmit within a particular time frame. The limitations may be based on various factors, including the particular subcarrier spacing used by the system and the frequency band in which the system operates.

Figure 4:
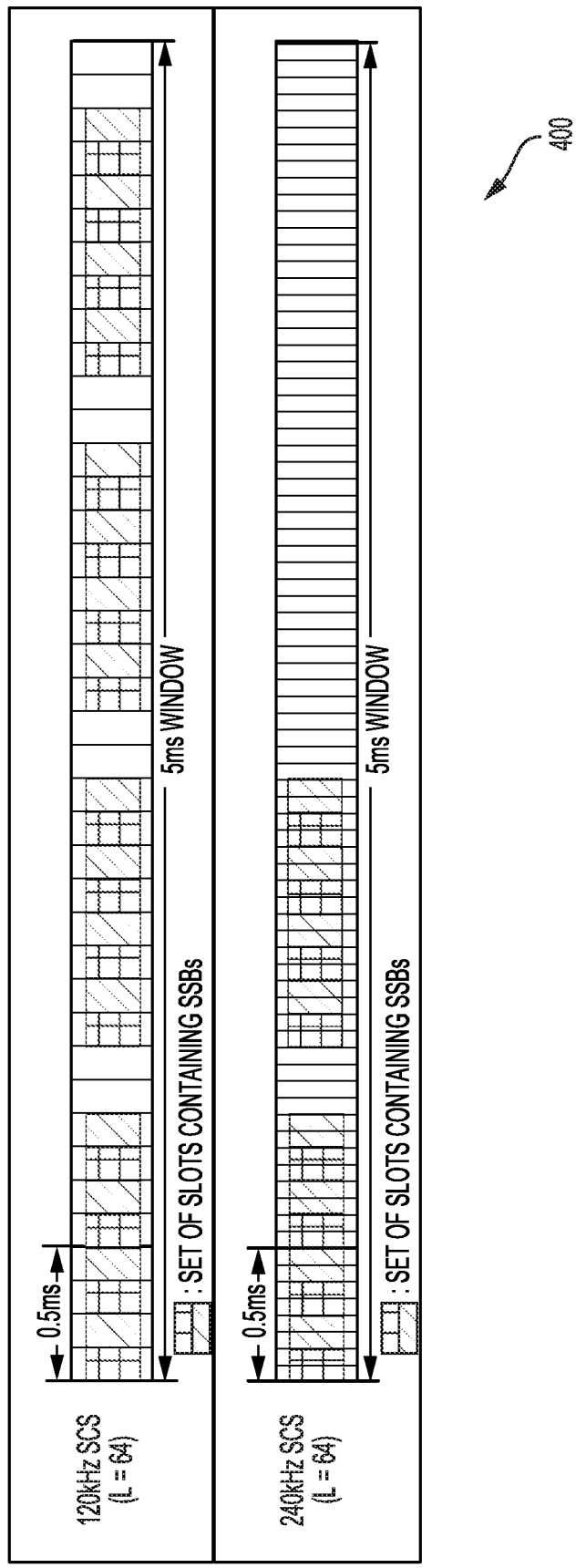
FIG. 4 illustrates example configurations of patterns of SS block transmission opportunities.

FIG. 4 illustrates example configurations 400 of patterns of SS block transmission opportunities based on various system parameters. As shown in FIG. 4, the number of SS block transmission opportunities and their corresponding locations that a base station 105 has within a measurement window (e.g., 5 ms window) may depend on the subcarrier spacing employed by the system and the frequency band in which the system operates. The UE may measure cell DRS according to periodically configured discovery reference signal (DRS) measurement timing configuration (DMTC) periods window. The DMTC may be configured for measurements of a serving cell or neighbor cells, or both. Further, the DMTC may be frequency specific or may be applicable to multiple frequencies in various examples. The length of a slot in each configuration may vary depending on the subcarrier spacing used in the configuration. In configuration 410, a subcarrier spacing of 120 kHz is used within an over-6 GHz frequency band (e.g., 60 GHz frequency band). Within a 5 ms window, the base station 105 in this configuration 410 may be allowed to transmit L=64 SS blocks (i.e., two SS blocks per slot), which may be required to be transmitted according to a particular pattern of allocated resources for the SS blocks. In configuration 420, a subcarrier spacing of 240 kHz is used within a frequency band of over 6 GHz (e.g., 60 GHz), and the maximum number of SS block transmissions is L=64, which may be required to be transmitted according to a particular pattern of allocated resources for the SS blocks. The 64 SS blocks may be referred to as an SS block burst set. The pattern and maximum number of SS blocks allowed within a measurement window may vary in other configurations, depending on the subcarrier spacing used and frequency band in which the base station 105 and UE 115 operate.

No more than 64 SS blocks may be transmitted in the example configurations 410 and 420, but fewer SS blocks may be transmitted depending on the implementation. Accordingly, the base station 105 may signal an indication of which of the possible 64 SS blocks are transmitted to a UE 115, which allows the UE 115 to perform rate matching, RRM measurements, or RACH resource association. In some instances, a base station 105 may use a full bitmap to indicate which of the potential SS block transmission opportunities are used for an actual SS block transmission. For example, each bit in the bitmap could indicate whether the corresponding SS block transmission for that predefined transmission opportunity is actually transmitted. In an example, a binary "zero" in a least significant bit of the bitmap may indicate the SS block for the first transmission opportunity of the burst set is not transmitted, while a binary "one" may indicate the SS block for the first transmission opportunity is transmitted, and so forth.

In some instances, the indication may be signaled using RRC signaling, such as for connected mode operation, so that the UE 115 may perform rate matching. In some instances, the indication may be signaled in RMSI, which may be included in the PBCH and/or PDSCH, such as for initial access before the UE 115 obtains system information. A serving base station 105 and a neighboring cell may both be required to indicate transmitted SS blocks within a SS burst set, such as for mobility management or RRM measurements. In order to reduce decoding attempts needed to obtain such indication from neighbor cells, and thereby improving UE 115 power consumption, a serving base station 105 may provide an indication of transmitted SS blocks of a neighbor cell, in addition to indication of transmitted SS blocks of the serving base station 105. If the neighbor cell's transmitted SS blocks are not identical to the transmitted SS blocks of the serving cell 105, the serving cell 105 may signal the delta difference between the pattern of transmitted SS blocks of the neighbor cell compared to the pattern of transmitted SS blocks of the serving cell 105. This indication may be signaled in various forms, including as a bitmap, table, and the like.

In the example configurations 410 and 420, a full bitmap would require 64 bits to indicate which of the 64 SS block transmission opportunities are actually used to transmit SS blocks. A compressed form for indication of transmitted SS blocks may reduce required resources for such indication, especially in instances where there are 64 SS block transmission opportunities within an SS burst set. In particular, base station 105 may select SS blocks for transmission such that they are generally in a compact format, which may reduce the number of bits required to indicate transmitted SS blocks, as well as providing power savings for the UE 115 and other benefits, as the UE 115 may not need to monitor for SS blocks for longer durations.

Figure 5:
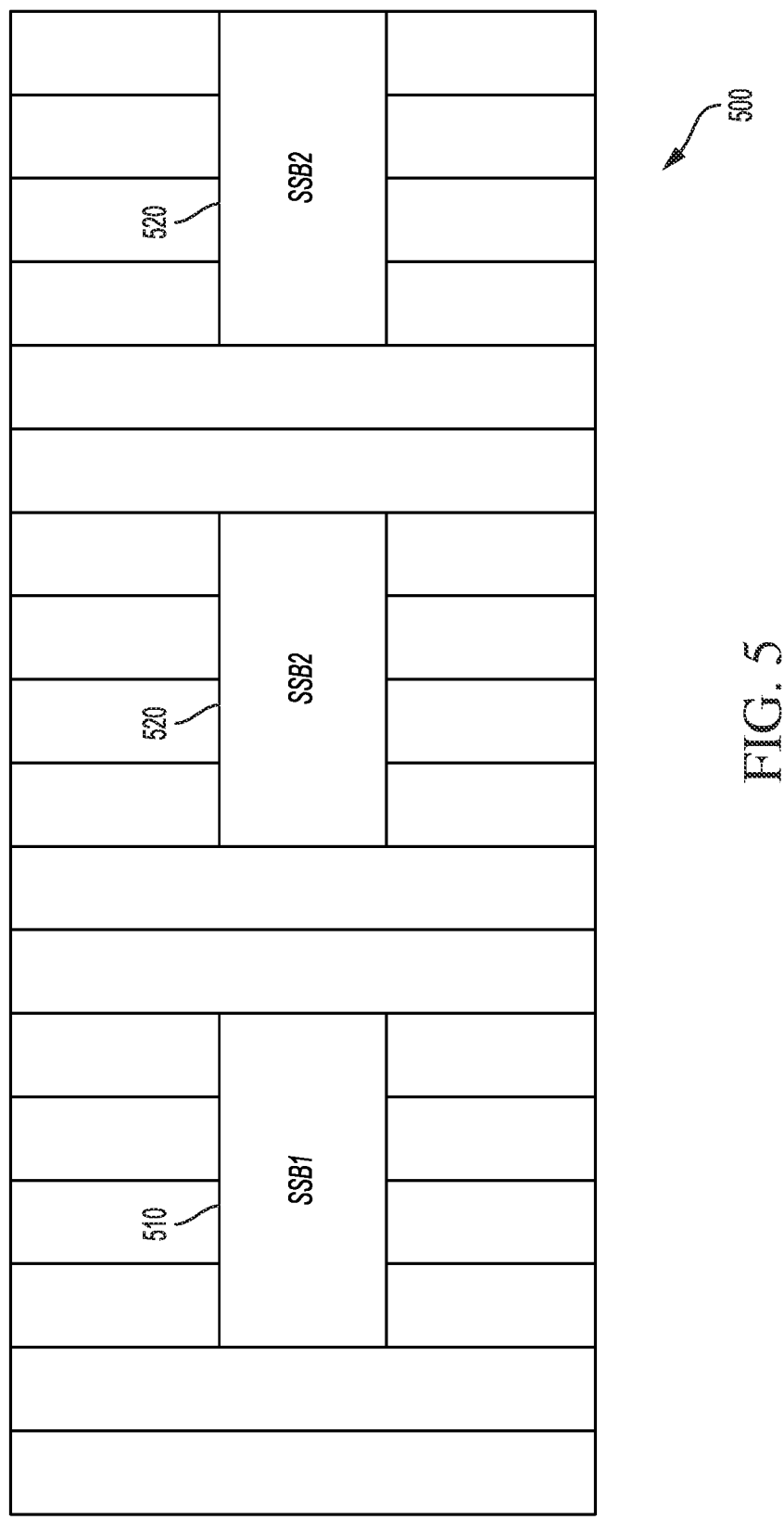
FIG. 5 illustrates an example configuration of SS block transmission opportunities.

FIG. 5 illustrates an example configuration 500 of SS block transmission opportunities with reference to frequency and time resources (e.g., symbols). For simplicity, FIG. 5 illustrates three SS blocks, but the number of SS block transmission opportunities within a SS burst set may be more, such as L=64 SS blocks in a burst set for operation in over 6 GHz frequency bands. In some instances, there may be predefined locations within a measurement window that are allocated for SS block transmissions. For example, SS blocks 510, 520, and 530 may each be allocated particular resources, and a base station may choose to transmit all, none, or any combination of SS blocks 510, 520, or 530 at their designated resources. The base station 105 may choose to transmit SS blocks 510 and 530 while refraining from transmitting SS block 520. In this scenario, the base station 105 transmits the SS blocks 510 and 530 in a manner that is not "logically consecutive," that is, there may be intervening opportunities (e.g., at 520) between SS block transmissions (510 and 530) in which the base station 105 does not transmit an SS block. Alternatively, the base station 105 may instead transmit SS blocks 510 and 520, in which case, the transmitted SS blocks are considered logically consecutive.

In some instances, a base station 105 may transmit SS blocks in a logically consecutive manner, where possible. For example, if there are eight SS block transmission opportunities within an SS burst set, and the base station 105 determines to transmit SS blocks at two of those opportunities, the base station 105 may transmit SS blocks at two logically consecutive locations instead of two SS blocks separated by gaps of non-transmitted SS blocks. While the selection of logically consecutive SS blocks for transmission may result in UE power savings, there may be other benefits as well, such as allowing for compact forms of indication of transmitted SS blocks, as will be described in further detail below.

Figure 6:
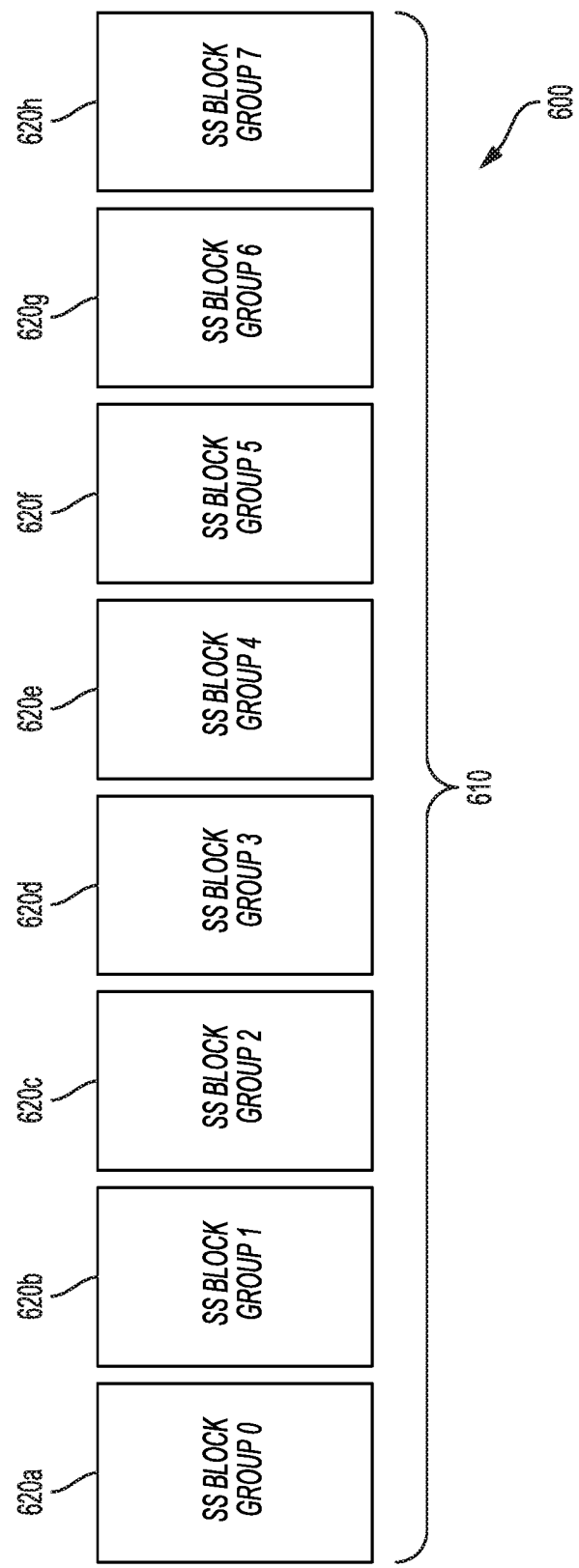
FIG. 6 illustrates an example sequence of SS block groups.

FIG. 6 illustrates an example set 600 of groups of SS blocks to assist with compact indication of transmitted SS blocks. The illustrated blocks in FIG. 6 represent sequential ordering of groups of SS blocks within a SS burst set, and not necessarily physical resources allocated for the groups. A base station 105 operating in an over 6 GHz frequency band would have a maximum of L=64 SS blocks that it could transmit within a burst set 610. In some instances, the base station 105 may divide the total maximum SS blocks into N groups. The illustrated example depicts a division of SS blocks in the burst set 610 into different SS block groups 620a-h. If the total number of SS blocks in the measurement window 610 is 64, the base station 105 may divide the 64 SS blocks into eight groups, with each of the eight groups further comprising eight SS blocks.

Following the principle of transmitting SS blocks in a logically consecutive manner where possible, in the present example, the base station 105 may transmit all eight SS blocks of a particular SS block group 620 if the base station 105 selects the particular SS block group 620 for actual transmission. Further, if the base station 105 elects to transmit multiple SS block groups 620 within the SS burst set 610, those multiple SS block groups 620 are also transmitted in a logically consecutive manner. For example, if base station 105 elects to transmit three SS block groups 620 within SS burst set 610, it might select SS block groups 2, 3, and 4 for transmission. The base station 105 would then further transmit each SS block within those SS block groups, which would result in 24 logically consecutive SS blocks being transmitted within the SS burst set 610. Here, the base station 105 would refrain from transmitting SS block groups 0, 1, 5, 6, and 7.

Operating under these principles, the base station 105 may then convey an indication of transmitted SS blocks in a compressed form. The different possible SS block group 620 combinations within a SS burst set 610 can each comprise a group set. If only logically consecutive SS block group 620 combinations are considered, there are 36 possible group sets in a configuration of 64 SS blocks divided into eight SS block groups 620, with eight SS blocks in each SS block group 620. Each combination or group set may then be assigned or associated with a group transmission configuration index. When the base station 105 transmits the group transmission configuration index, the UE 115 may then determine which group set and also, by extension, which SS blocks are transmitted by the base station 105.

Table 1 depicts the possible group sets, with their associated group transmission configuration indices, when there are eight SS block groups, each numbered 0 through 7. Continuing with the described example above, if base station 105 elects to transmit SS block groups 2, 3, and 4 within SS burst set 610, it would identify a group transmission configuration index of 17 from Table 1. The base station 105 could then transmit the group transmission configuration index to a UE 115 to indicate which SS blocks are transmitted by the base station 105. The UE 115, upon receiving the group transmission configuration index, could determine that SS block groups 2, 3, and 4 are transmitted by the base station 105 based on Table 1. As can be seen, the 36 different group transmission configuration indices in this example can be transmitted using 6 bits, as opposed to a full 64-bit bitmap.

TABLE 1

Group transmission configuration in a SS burst set with 8 SS block groups (6 bits)

| Group transmission configuration set index | Group set of transmitted group indices |
|---|---|
| 0 | 0 |
| 1 | 0, 1 |
| 2 | 0, 1, 2 |
| 3 | 0, 1, 2, 3 |
| 4 | 0, 1, 2, 3, 4 |
| 5 | 0, 1, 2, 3, 4, 5 |
| 6 | 0, 1, 2, 3, 4, 5, 6 |
| 7 | 0, 1, 2, 3, 4, 5, 6, 7 |
| 8 | 1 |
| 9 | 1, 2 |
| 10 | 1, 2, 3 |
| 11 | 1, 2, 3, 4 |
| 12 | 1, 2, 3, 4, 5 |
| 13 | 1, 2, 3, 4, 5, 6 |
| 14 | 1, 2, 3, 4, 5, 6, 7 |
| 15 | 2 |
| 16 | 2, 3 |
| 17 | 2, 3, 4 |
| 18 | 2, 3, 4, 5 |
| 19 | 2, 3, 4, 5, 6 |
| 20 | 2, 3, 4, 5, 6, 7 |
| 21 | 3 |
| 22 | 3, 4 |
| 23 | 3, 4, 5 |

TABLE 1-continued

Group transmission configuration in a SS burst set with 8 SS block groups (6 bits)

| Group transmission configuration set index | Group set of transmitted group indices |
|---|---|
| 24 | 3, 4, 5, 6 |
| 25 | 3, 4, 5, 6, 7 |
| 26 | 4 |
| 27 | 4, 5 |
| 28 | 4, 5, 6 |
| 29 | 4, 5, 6, 7 |
| 30 | 5 |
| 31 | 5, 6 |
| 32 | 5, 6, 7 |
| 33 | 6 |
| 34 | 6, 7 |
| 35 | 7 |

Other group configurations are within the scope of the present disclosure. For example, the base station 105 may divide the possible SS block transmissions in the SS burst set 610 into four groups instead of eight. With four SS block groups, a base station 105 may only need four bits to transmit indication of transmitted SS blocks. Table 2 depicts an example of group transmission configuration indices associated with the possible group sets when there are four SS block groups, indexed 0 through 3.

TABLE 2

Group transmission configuration in a SS burst set with 4 SS block groups (4 bits)

| Group transmission configuration index | Transmitted group indices |
|---|---|
| 0 | 0 |
| 1 | 0, 1 |
| 2 | 0, 1, 2 |
| 3 | 0, 1, 2, 3 |
| 4 | 1 |
| 5 | 1, 2 |
| 6 | 1, 2, 3 |
| 7 | 2 |
| 8 | 2, 3 |
| 9 | 3 |

Accordingly, the base station 105 may construct a group set table comprising various combinations of logically consecutive SS block group transmissions and signal to the UE 115 an indication of which pattern is used for SS block transmission. In particular, if there are N SS block groups in an SS burst set, and the starting SS block group of the SS burst set is identified as n, the SS block group combinations (i.e., group sets) may be represented as:

$$n$$

$$n, n+1$$

$$n, n+1, n+2$$

$$...$$

$$n, n+1, \ldots, N-1.$$

By using all possible group sets of logically consecutive SS block groups, there may be $N*(N+1)/2$ total group sets to be included in the group set table. The base station 105 may select one group set for transmission of SS blocks in the group set and send an indication comprising a group transmission configuration index of the selected one group set. In some instances, the group set table may comprise a subset of all possible group sets. For example, certain combinations of SS block groups may be excluded from the table. The base station 105 may determine that some group sets will not be available for transmission. In this case, fewer bits may be required for sending the indication of transmitted SS blocks, depending on the number of excluded group sets.

Figure 7:
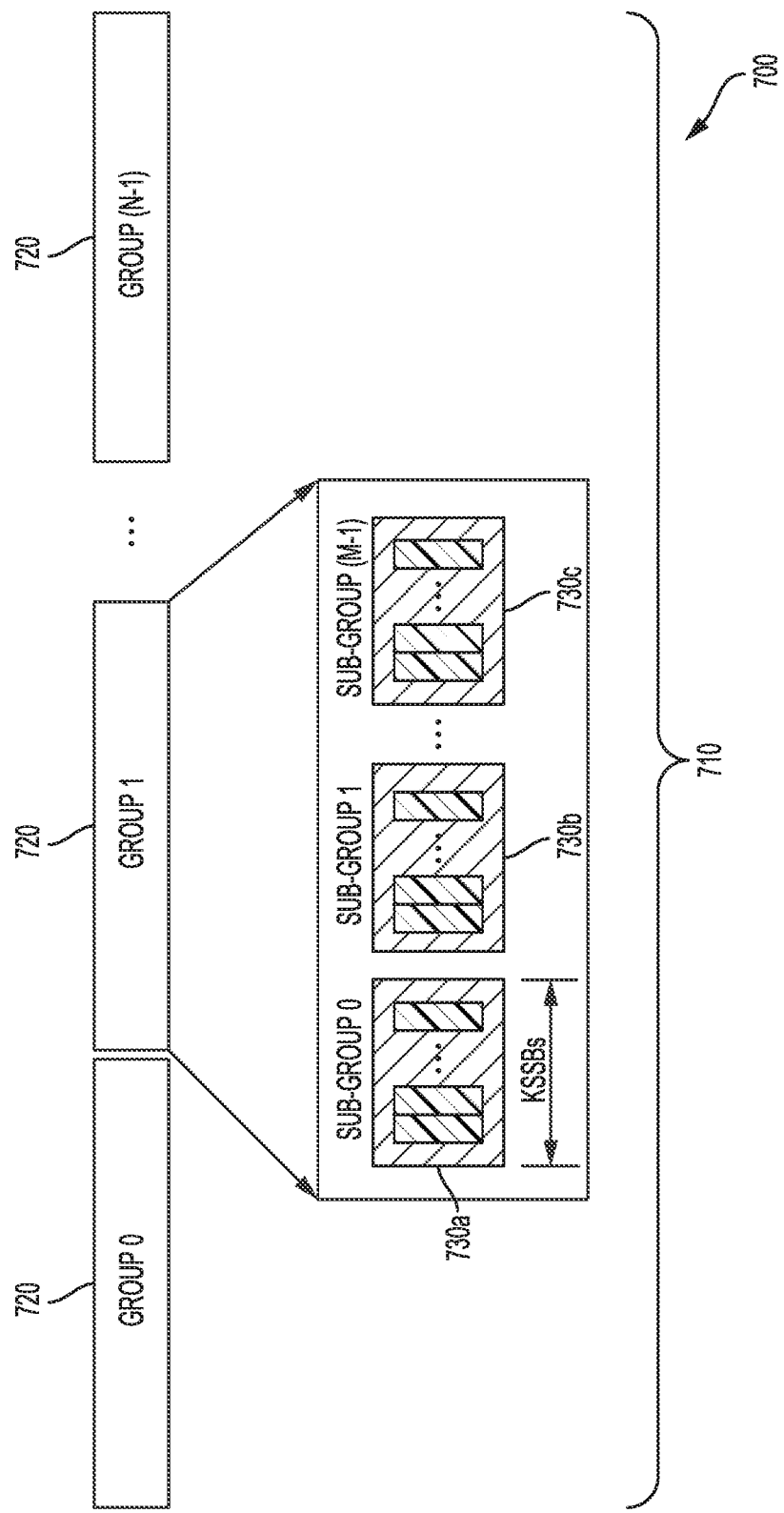
FIG. 7 illustrates an example configuration of sub-groups within a SS block group.

In some situations, the base station 105 may use other SS block transmission techniques for additional flexibility while still maintaining compact indication of transmitted SS blocks. FIG. 7 illustrates a SS block transmission configuration 700 using sub-groups of SS blocks in addition to groups. As seen in FIG. 7, a SS burst set 710 may be divided into N groups 720 of SS blocks, where the groups are indexed from 0 to N−1. Further, each group 720 may further be divided into M sub-groups 730, where the sub-groups 730 are indexed from 0 to M−1. The sub-groups 730 may include logically consecutive SS blocks. In some instances, if a particular sub-group 730 is selected for transmission by a base station 105, each SS block in that sub-group 730 is transmitted by the base station 105. The base station 105 may also determine which sub-groups 730 within a group 720 are transmitted, and use the same pattern of transmitted sub-groups 730 for each group 720 within the SS burst set 710. Accordingly, the base station 105 may signal an indication of which sub-groups 730 are transmitted for only one of the groups 720, as the UE 115 may infer from the indication that the same pattern of transmitted sub-groups 730 for one group 720 is applicable to all transmitted groups 720 within the SS burst set 710.

The base station 105 may also apply a particular rule for determining which logically consecutive sub-groups 730 in the group 720 will be transmitted. For example, the base station 105 may determine to transmit two sub-groups 730 out of four total sub-groups 730 from a SS block group 720. The base station 105 may apply a rule that the number of transmitted sub-groups 730 is determined based on a starting sub-group 730$a$ of the SS block group 720, so the first two sub-groups 730 are transmitted while the last two are not. Alternatively, the base station 105 may apply a rule that the number of transmitted sub-groups 730 is determined based on an ending sub-group 730$c$ of the SS block group 720, resulting in the last two sub-groups 730 being transmitted while the first two are not. If a particular rule is applied, the base station 105 may only need to include a number of sub-groups 730 to be transmitted within a group 720, since the UE may determine which of the sub-groups 730 are transmitted based on the number and rule. For example, the UE may use the rule that the transmitted sub-groups 730 is determined based on a first sub-group 730$a$ of the group 720, so if the number of sub-groups is two, the UE may determine that the first two sub-groups 730 of each group are transmitted. In some examples, the number of transmitted sub-groups 730 in a group 720 may be signaled using two bits attached to the group set index that is also indicated to the UE 115.

In some instances, other forms of indicating which SS blocks in a group 720 may be used for providing flexibility. For example, the base station 105 may transmit particular SS blocks within a SS block group, and the transmitted SS blocks may not necessarily be logically consecutive. To indicate which of the SS blocks in the SS block group are transmitted, the base station 105 may transmit a bitmap indicating which SS block transmission opportunities within a group are actually used. The same pattern of transmitted SS blocks within the group may be used for all groups in the SS burst set 710 that are transmitted.

In certain instances, the base station 105 may also associate an index for each combination of transmitted SS block(s) within a SS block group. Similar to transmitting SS block groups in a logically consecutive manner as described above with reference to Tables 1 and 2, the base station 105 may also transmit SS blocks within a SS block group in a logically consecutive manner where possible. Accordingly, only combinations involving consecutively transmitted SS blocks within an SS block group may be considered by the base station 105. Using the example where there are eight SS block groups in an SS burst set, with eight SS blocks per group, the base station 105 may assign an SS transmission configuration index to each combination of transmitted SS blocks, as depicted in Table 3 below.

TABLE 3

SS block transmission configuration in a SS block group (6 bits)

| SS block transmission configuration index | Transmitted SS block indices |
|---|---|
| 0 | 0 |
| 1 | 0, 1 |
| 2 | 0, 1, 2 |
| 3 | 0, 1, 2, 3 |
| 4 | 0, 1, 2, 3, 4 |
| 5 | 0, 1, 2, 3, 4, 5 |
| 6 | 0, 1, 2, 3, 4, 5, 6 |
| 7 | 0, 1, 2, 3, 4, 5, 6, 7 |
| 8 | 1 |
| 9 | 1, 2 |
| 10 | 1, 2, 3 |
| 11 | 1, 2, 3, 4 |
| 12 | 1, 2, 3, 4, 5 |
| 13 | 1, 2, 3, 4, 5, 6 |
| 14 | 1, 2, 3, 4, 5, 6, 7 |
| 15 | 2 |
| 16 | 2, 3 |
| 17 | 2, 3, 4 |
| 18 | 2, 3, 4, 5 |
| 19 | 2, 3, 4, 5, 6 |
| 20 | 2, 3, 4, 5, 6, 7 |
| 21 | 3 |
| 22 | 3, 4 |
| 23 | 3, 4, 5 |
| 24 | 3, 4, 5, 6 |
| 25 | 3, 4, 5, 6, 7 |
| 26 | 4 |
| 27 | 4, 5 |
| 28 | 4, 5, 6 |
| 29 | 4, 5, 6, 7 |
| 30 | 5 |
| 31 | 5, 6 |
| 32 | 5, 6, 7 |
| 33 | 6 |
| 34 | 6, 7 |
| 35 | 7 |

Table 3 depicts the possible combinations of consecutive SS blocks, with their associated SS transmission configuration indices, when there are eight SS blocks per group, each numbered 0 through 7. In an example, if base station 105 elects to transmit SS blocks 2, 3, and 4 within a SS block, it would identify a SS block transmission configuration index of 17 from Table 1. The base station 105 could then transmit the SS block transmission configuration index to a UE 115 to indicate SS blocks 2, 3, and 4 in the SS block group is transmitted by the base station 105. As can be seen, the 36 different SS block transmission configuration indices in this example can be transmitted using 6 bits, as opposed to a full 64-bit bitmap. Accordingly, the SS block transmission index may be another form of indication of which SS blocks in an SS block group are transmitted. The same pattern of transmitted SS blocks within the group may be used for all groups in the SS burst set 710 that are transmitted. In some instances, the SS transmission per group table may comprise a subset of all possible combinations. For example, certain combinations of SS blocks may be excluded from the table. The base station 105 may determine that some SS block combinations will not be available for transmission. In this case, fewer bits may be required for sending the indication of transmitted SS blocks, depending on the number of excluded combinations.

In an example where the number of SS blocks in an SS burst set 710 is 64 and there are eight groups of eight SS blocks in each group, the base station 105 may indicate which SS blocks are transmitted by first determining a group transmission configuration index identifying transmitted groups. As shown above in Table 1, the group transmission configuration index may comprise six bits in a scenario where the SS burst set 710 is 64 SS blocks. If the base station 105 further divides the groups 720 into sub-groups 730, an additional two bits may be used to indicate a number of sub-groups 730 within each group 720 that will be transmitted. The two bits may be appended to the six bits of the group transmission configuration index. Alternatively, if the base station 105 uses a bitmap indicating particular SS block transmissions within a group, the base station 105 may use another eight bits to convey which particular SS blocks within each group are transmitted. The eight-bit bitmap may be included with the six-bit group transmission configuration index. In other instances, if the base station 105 uses a SS block transmission configuration index as described with respect to Table 3, the base station 105 may use six bits to convey the SS block transmission configuration index associated with the transmitted SS blocks in each group. The six bits for the SS transmission index may be included with the six bits for the group set index, for a total of 12 bits.

Figure 8:
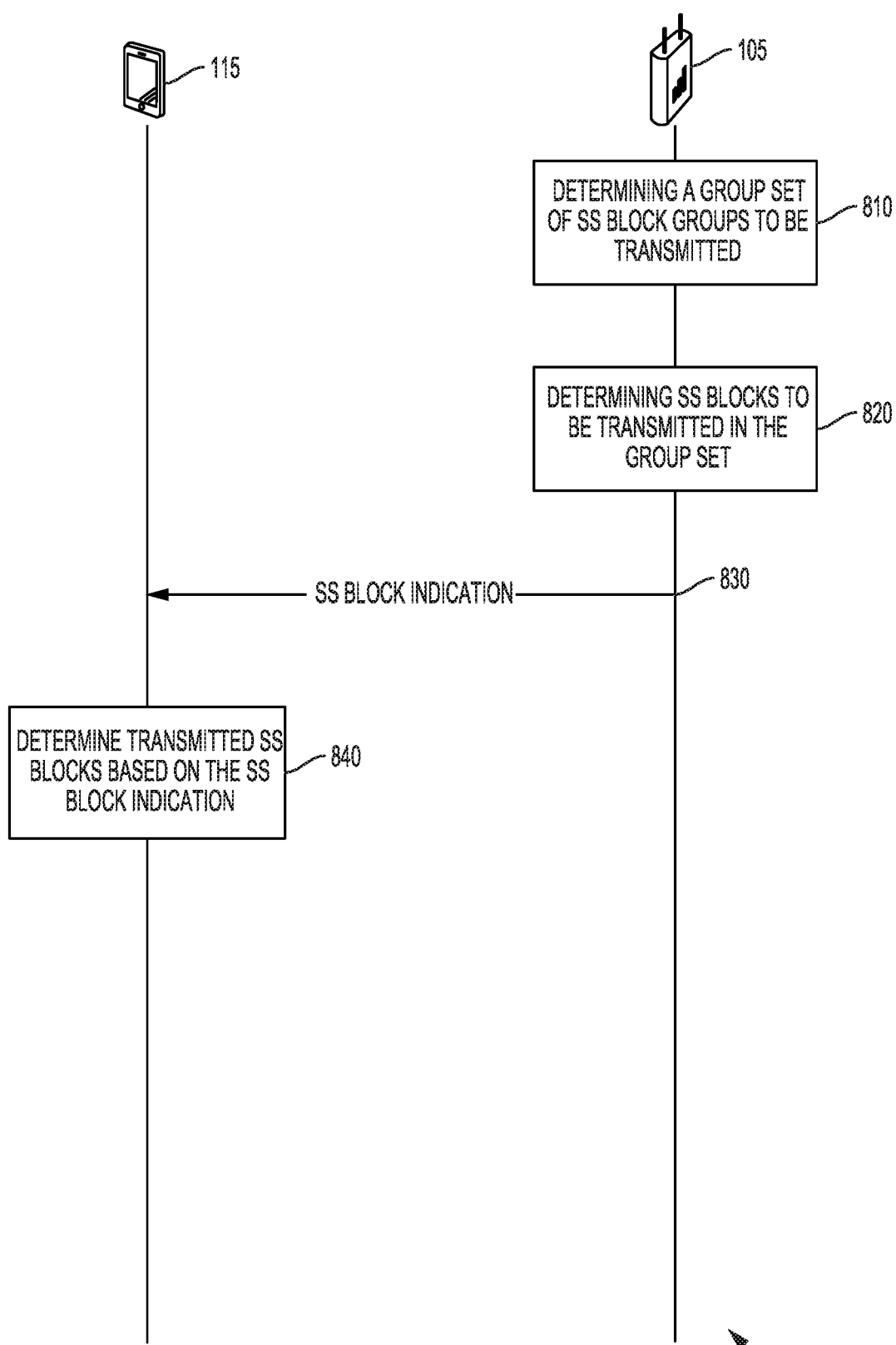
FIG. 8 illustrates an example process flow in a system that supports compressed SS block indication signaling techniques.

FIG. 8 illustrates an example of a process flow 800 in a system that supports compressed SS block indication techniques in accordance with aspects of the present disclosure. Process flow 800 may include base station 105 and UE 115, which may be examples of the corresponding devices described with reference to FIGS. 1-2.

At 810, a base station 105 determines a group set of SS block groups to be transmitted. At 820, the base station 105 determines SS blocks to be transmitted in the group set. As described above, the base station 105 may transmit logically consecutive SS block groups. In some instances, each SS block in each transmitted SS block group is transmitted in the group set. Alternatively, the base station 105 may transmit each SS block in each sub-group that is transmitted in the group set. The base station 105 may also transmit particular SS blocks that may not necessarily be logically consecutive in each SS block group.

At 830, the base station 105 transmits an SS block indication to the UE 115. The SS block indication may vary depending on how the base station 105 determines SS blocks for transmission. For example, the SS block indication may be a group transmission configuration index if the base station 105 transmits each SS block in each transmitted SS block group. In some instances, in addition to the group transmission configuration index, the base station 105 may also include a number of sub-groups transmitted in each SS block group, a bitmap of transmitted SS blocks in each SS block group, or an SS block transmission configuration index associated with a combination of logically consecutive transmitted SS blocks.

At 840, the UE determines which are the transmitted SS blocks in the SS burst set based on the received SS block indication.

Figure 9:
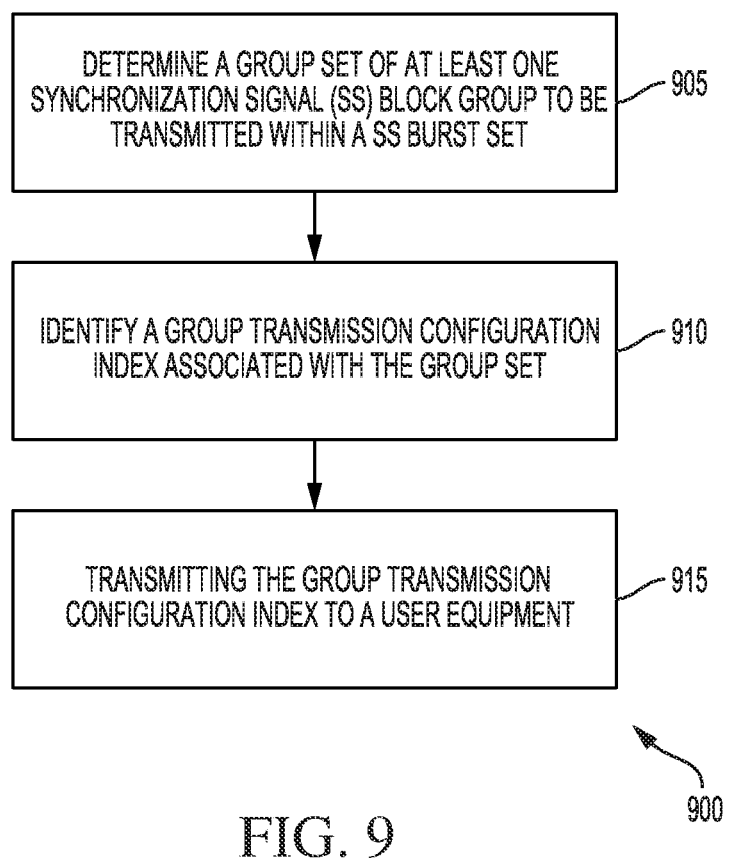
FIG. 9 illustrates a method for transmission of compressed SS block indication signaling in accordance with aspects of the present disclosure.

FIG. 9 shows a flowchart illustrating a process 900 for compressed SS block indication techniques in accordance with various aspects of the present disclosure. The operations of process 900 may be implemented by a device such as a base station or its components, as described with reference to FIGS. 1 and 2. For example, the operations of process 900 may be performed by the processor 240, either alone or in combination with other components, as described herein. In some examples, the base station 105 may execute a set of codes to control the functional elements of the device to perform the functions described below. Additionally or alternatively, the base station 105 may perform aspects of the functions described below using special-purpose hardware.

At 905, the base station 105 determines a group set of at least one synchronization signal (SS) block group to be transmitted within a SS burst set. At 910, the base station 105 identifies a group transmission configuration index associated with the group set. At 915, the base station transmits the group transmission configuration index to a user equipment.

Figure 10:
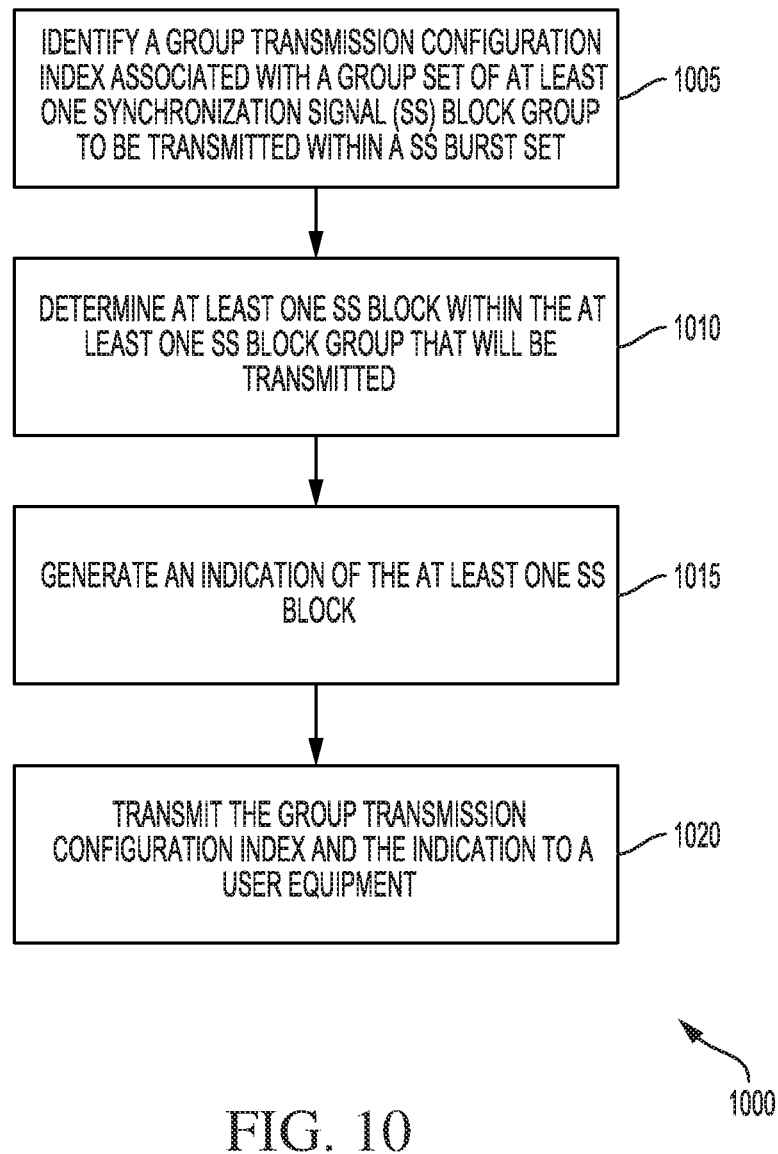
FIG. 10 illustrates a method for transmission of compressed SS block indication signaling in accordance with aspects of the present disclosure.

FIG. 10 shows a flowchart illustrating a process 1000 for compressed SS block indication techniques in accordance with various aspects of the present disclosure. The operations of process 1000 may be implemented by a device such as a base station or its components, as described with reference to FIGS. 1 and 2. For example, the operations of process 1000 may be performed by the processor 240, either alone or in combination with other components, as described herein. In some examples, the base station 105 may execute a set of codes to control the functional elements of the device to perform the functions described below. Additionally or alternatively, the base station 105 may perform aspects of the functions described below using special-purpose hardware.

At 1005, the base station 105 identifies a group transmission configuration index associated with a group set of at least one synchronization signal (SS) block group to be transmitted within a SS burst set. At 1010, the base station 105 determines at least one SS block within the at least one SS block group that will be transmitted. At 1015, the base station 105 generates an indication of the at least one SS block. At 1020, the base station 105 transmits the group transmission configuration index and the indication to a user equipment.

Figure 11:
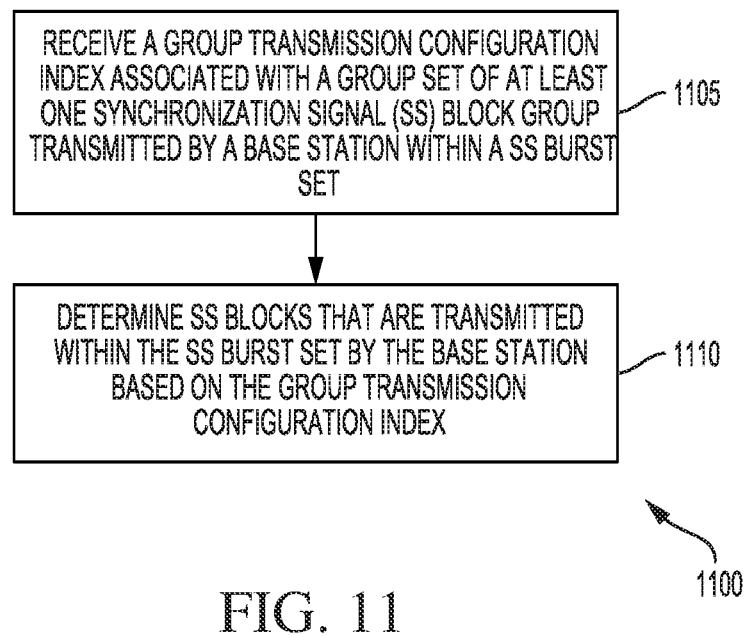
FIG. 11 illustrates a method for determining transmitted SS blocks in accordance with aspects of the present disclosure.

FIG. 11 shows a flowchart illustrating a process 1100 for compressed SS block indication techniques in accordance with various aspects of the present disclosure. The operations of process 1100 may be implemented by a device such as a UE or its components, as described with reference to FIGS. 1 and 2. For example, the operations of process 1100 may be performed by the processor 280, either alone or in combination with other components, as described herein. In some examples, the UE 115 may execute a set of codes to control the functional elements of the device to perform the functions described below. Additionally or alternatively, the UE 115 may perform aspects of the functions described below using special-purpose hardware.

At 1105, the UE 115 receives a group transmission configuration index associated with a group set of at least one synchronization signal (SS) block group transmitted by a base station within a SS burst set. At 1110, the UE 115 determines SS blocks that are transmitted within the SS burst set by the base station based on the group transmission configuration index.

Figure 12:
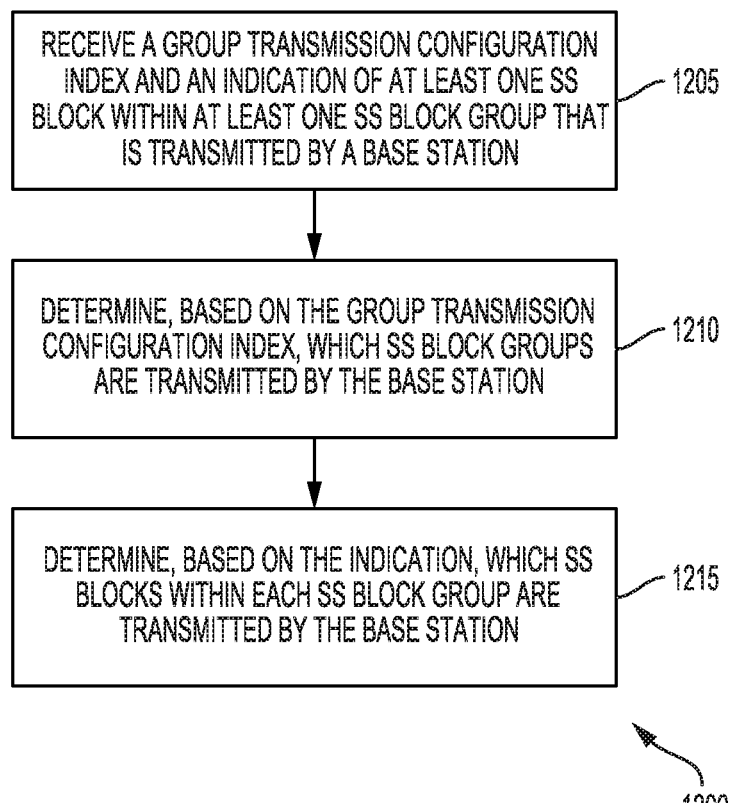
FIG. 12 illustrates a method for determining transmitted SS blocks in accordance with aspects of the present disclosure.

FIG. 12 shows a flowchart illustrating a process 1200 for compressed SS block indication techniques in accordance with various aspects of the present disclosure. The operations of process 1200 may be implemented by a device such as a UE or its components, as described with reference to FIGS. 1 and 2. For example, the operations of process 1200 may be performed by the processor 280, either alone or in combination with other components, as described herein. In some examples, the UE 115 may execute a set of codes to control the functional elements of the device to perform the functions described below. Additionally or alternatively, the UE 115 may perform aspects of the functions described below using special-purpose hardware.

At 1205, the UE 115 receives a group transmission configuration index and an indication of at least one SS block within at least one SS block group that is transmitted by a base station. At 1210, the UE 115 determines, based on the group transmission configuration index, which SS block groups are transmitted by the base station. At 1215, the UE 115 determines, based on the indication, which SS blocks within each SS block group are transmitted by the base station.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 2 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for indicating transmitted synchronization signal (SS) blocks comprising:
   determining a group set of at least one SS block group to be transmitted within a SS burst set;
   identifying a group transmission configuration index associated with the group set; and
   transmitting the group transmission configuration index to a user equipment.

2. The method of claim 1, wherein the at least one SS block group includes logically consecutive SS blocks to be transmitted within the SS burst set.

3. The method of claim 2, wherein the group set includes logically consecutive SS block groups to be transmitted within the SS burst set.

4. The method of claim 1, wherein the group transmission configuration index is identified from a plurality of group transmission configuration indices, each of the group transmission configuration indices associated with a different group set comprising a different pattern of SS block groups to be transmitted within the SS burst set.

5. The method of claim 4, wherein the plurality of group transmission configuration indices comprises group transmission configuration indices associated with a subset of all possible patterns of SS block groups available for transmission to the user equipment.

6. The method of claim 1, further comprising transmitting each SS block in the group set to the user equipment.

7. The method of claim 1, further comprising:
   determining at least one SS block within the at least one SS block group that will be transmitted;
   generating an indication of the at least one SS block; and
   transmitting the indication to the user equipment.

8. The method of claim 7, wherein the determining the at least one SS block comprises identifying a number of sub-groups from the at least one SS block group to be transmitted within a particular SS block group.

9. The method of claim 8, wherein an identified sub-group comprises logically consecutive SS blocks to be transmitted to the user equipment.

10. The method of claim 8, wherein the indication of the at least one SS block includes the number of sub-groups.

11. The method of claim 7, wherein the indication of the at least one SS block includes a bitmap indicating which SS block of the at least one SS block group is to be transmitted.

12. An apparatus for indicating transmitted synchronization signal (SS) blocks, comprising:
   a processor;
   memory in electronic communication with the processor; and instructions stored in the memory and operable, when executed by the processor, to cause the apparatus to:

determine a group set of at least one SS block group to be transmitted within a SS burst set;

identify a group transmission configuration index associated with the group set; and transmit the group transmission configuration index to a user equipment.

13. The apparatus of claim 12, wherein the at least one SS block group includes logically consecutive SS blocks to be transmitted within the SS burst set.

14. The apparatus of claim 13, wherein the group set includes logically consecutive SS block groups to be transmitted within the SS burst set.

15. The apparatus of claim 12, wherein the group transmission configuration index is identified from a plurality of group transmission configuration indices, each of the group transmission configuration indices associated with a different group set comprising a different pattern of SS block groups to be transmitted within the SS burst set.

16. The apparatus of claim 15, wherein the plurality of group transmission configuration indices comprises group transmission configuration indices associated with a subset of all possible patterns of SS block groups available for transmission to the user equipment.

17. The apparatus of claim 12, wherein the instructions are further executable by the processor to transmit each SS block in the group set to the user equipment.

18. The apparatus of claim 12, further comprising:
determining at least one SS block within the at least one SS block group that will be transmitted;
generating an indication of the at least one SS block; and
transmitting the indication to the user equipment.

19. The apparatus of claim 18, wherein the determining the at least one SS block comprises identifying a number of sub-groups from the at least one SS block group to be transmitted within a particular SS block group.

20. The apparatus of claim 19, wherein an identified sub-group comprises logically consecutive SS blocks to be transmitted to the user equipment.

21. The apparatus of claim 19, wherein the indication of the at least one SS block includes the number of sub-groups.

22. The apparatus of claim 18, wherein the indication of the at least one SS block includes a bitmap indicating which SS block of the at least one SS block group is to be transmitted.

23. A method for wireless communications comprising:
receiving a group transmission configuration index associated with a group set of at least one synchronization signal (SS) block group transmitted by a base station within a SS burst set;
determining SS blocks that are transmitted within the SS burst set by the base station based on the group transmission configuration index; and
receiving the determined SS blocks.

24. The method of claim 23, further comprising performing a rate matching procedure based on the SS blocks that are transmitted within the SS burst set.

25. The method of claim 23, further comprising:
receiving an indication of at least one SS block within the at least one SS block group that is transmitted by the base station; and
determining, based on the indication, which SS blocks within each SS block group are transmitted by the base station.

26. The method of claim 25, wherein the indication is a bitmap indicating which SS blocks in a SS block group are transmitted by the base station.

27. An apparatus for receiving transmitted synchronization signal (SS) blocks, comprising:
a processor;
memory in electronic communication with the processor; and
instructions stored in the memory and operable, when executed by the processor, to cause the apparatus to:
receive a group transmission configuration index associated with a group set of at least one synchronization signal (SS) block group transmitted by a base station within a SS burst set;
determine SS blocks that are transmitted within the SS burst set by the base station based on the group transmission configuration index; and
receive the determined SS blocks.

28. The apparatus of claim 27, wherein the instructions are further operable to cause the apparatus to perform a rate matching procedure based on the SS blocks that are transmitted within the SS burst set.

29. The apparatus of claim 27, wherein the instructions are further operable to cause the apparatus to:
receive an indication of at least one SS block within the at least one SS block group that is transmitted by the base station; and
determine, based on the indication, which SS blocks within each SS block group are transmitted by the base station.

30. The apparatus of claim 29, wherein the indication is a bitmap indicating which SS blocks in a SS block group are transmitted by the base station.

* * * * *